United States Patent [19]
Pestka

[11] 3,877,112
[45] Apr. 15, 1975

[54] COVER CLIP

[75] Inventor: John August Pestka, Park Ridge, Ill.

[73] Assignee: Illinois Tool Works Inc., Chicago, Ill.

[22] Filed: Mar. 8, 1974

[21] Appl. No.: 449,395

[52] U.S. Cl. .................................. 24/73 B; 248/27
[51] Int. Cl. ............................................ A44b 21/00
[58] Field of Search.. 24/73 B, 81 B, 81 PB, 81 PM, 24/73 MF; 248/27, 205 R; 174/51, 58; 339/32 R, 17, 75, 176; 52/36, 506, 520, 719

[56] References Cited
UNITED STATES PATENTS

| 2,261,650 | 11/1941 | Kost | 24/73 B |
|---|---|---|---|
| 2,467,604 | 4/1949 | Tinnerman et al. | 24/73 B X |
| 2,936,789 | 5/1960 | Krein | 24/73 B X |
| 3,312,444 | 4/1967 | De Sena | 24/81 B X |
| 3,606,223 | 9/1971 | Havener | 24/73 B X |

Primary Examiner—Geo. V. Larkin
Attorney, Agent, or Firm—Olson, Trexler, Wolters, Bushnell & Fosse, Ltd.

[57] ABSTRACT

A clip is provided for fastening a junction box cover to a backboard. The clip includes upstanding front and back tabs spaced apart by a base in a U-shaped configuration. Spring arms have respective front and back edges spaced, in a clip depth direction, from the clip tabs. A backboard flange is pinched between the clip spring arms and front tab, and a cover foot piece is pinched between the clip spring arms and back tab.

12 Claims, 8 Drawing Figures

PATENTED APR 15 1975          3,877,112
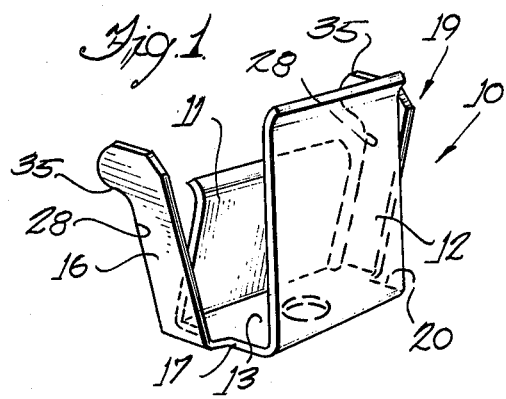
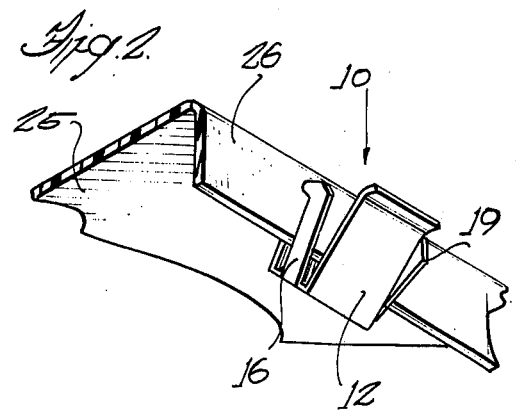
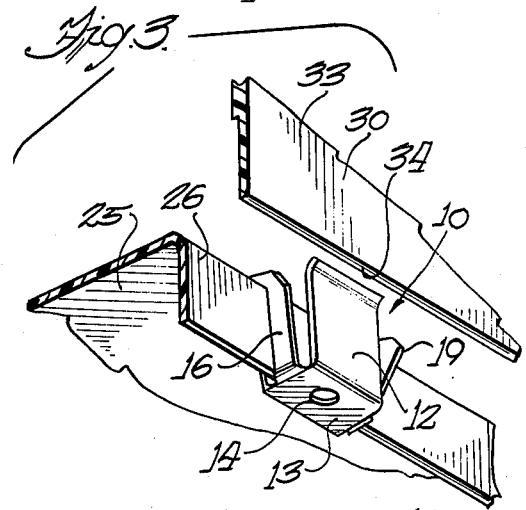
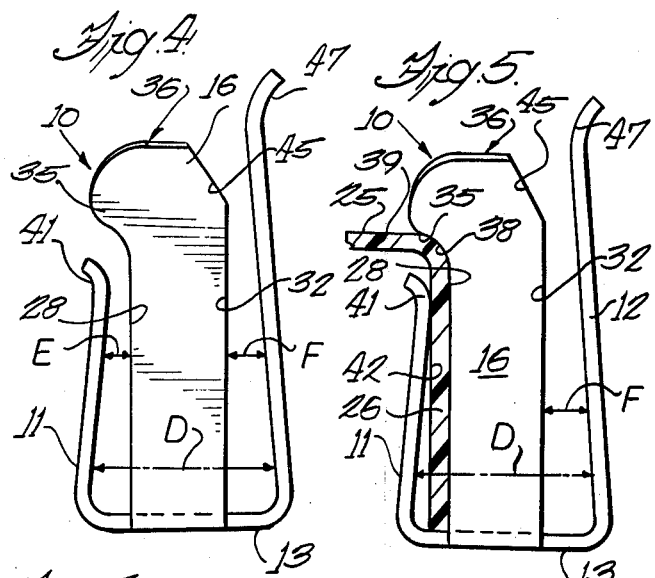
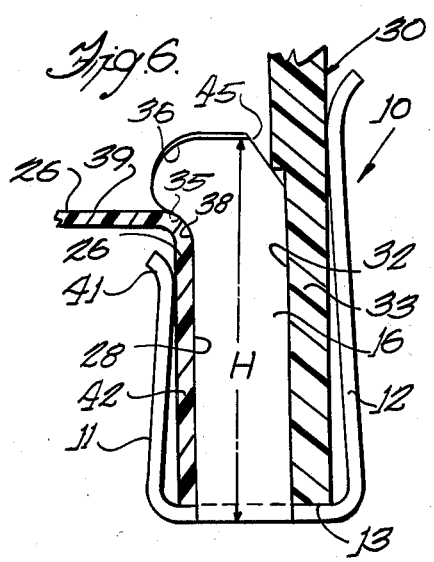
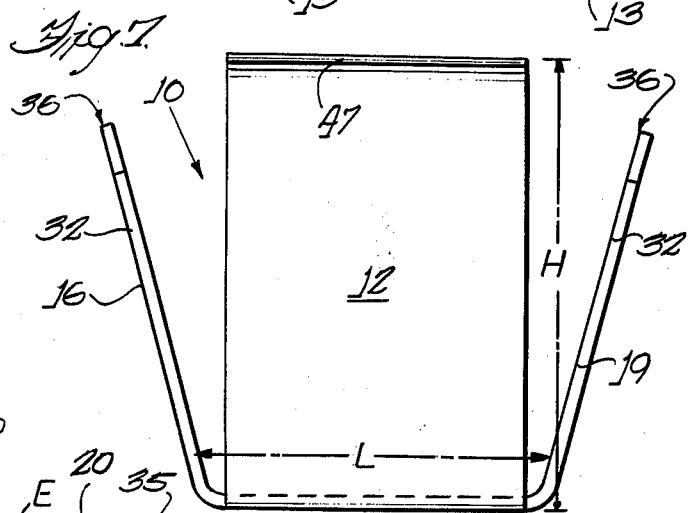
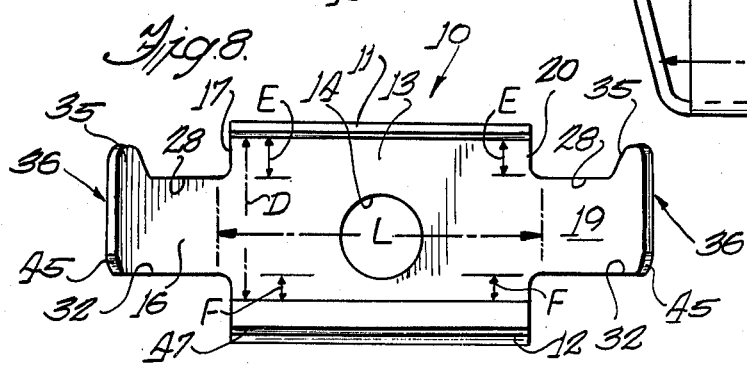

COVER CLIP

BACKGROUND OF THE INVENTION

This invention relates generally to fasteners, and more particularly concerns a clip member especially adapted to retain a cover member upon a backboard. In one application, it is contemplated that this cover member and backboard will comprise a telephone cable junction box.

It is the general object of the present invention to provide an inexpensive interconnecting clip for positively securing a cover member to a backboard member.

A more specific object of the invention is to provide an interconnector clip which will positively attach and firmly retain a cover member upon a backboard. A related object is to provide such a clip which, although small in size and inexpensive in manufactured cost, grips both the backboard member and cover member with relatively great retaining force. Yet another related object is to provide such a clip which secures an edge of the cover at a predetermined distance from the backboard itself.

Another object of the invention is to provide a clip member which greatly inhibits accidental disconnection of the cover, clip and backboard from one another when the cover is accidentally or otherwise pushed toward the backboard.

Another object is to provide a clip member which is easy to install and use.

A further object is to provide a clip member which is inconspicuous when intalled for use.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a perspective view of the clip member of the present invention;

FIG. 2 is a perspective view showing a portion of a typical backboard and depending flange, with the novel clip being installed thereon;

FIG. 3 is a perspective view similar to FIG. 4 but showing the clip member installed upon the backboard and flange, the cover member being positioned for insertion and attachment to the clip;

FIG. 4 is an elevational view showing in further detail the construction of the clip member;

FIG. 5 is an elevational view similar to FIG. 4 and showing in further detail the clip member as it appears when installed upon the backboard and flange;

FIG. 6 is an elevational view similar to FIGS. 4 and 5 and showing in further detail the clip member as it appears when installed upon the backboard and flange and grasping the cover member;

FIG. 7 is an elevational front view showing in yet further detail the clip member; and FIG. 8 is a plan view showing in yet further detial the novel clip member.

DETAILED DESCRIPTION

While the invention will be described in connection with a preferred embodiment, it is understood that it is not intended to limit the invention to this embodiment. On the contrary, it is intended to cover all alternatives modifications and equivalents as may be included within the spirit and scope of the invention.

Turning first to FIG. 1, there is shown a clip member 10 embodying the present invention, which here is formed of heat treated and tempered 1050 steel. In general, this clip member 10 can be considered to include an upstanding front tap 11, a back tab 12 and a planar base member 13 interconnecting the front tab 11 and back tab 12 in a generally squared U-shaped configuration. As illustrated particularly in FIG. 8, the front tab 11 and back tab 12 are spaced apart by a predetermined distance D in the direction of clip depth.

To accommodate a mounting screw or the like (not shown) a hole 14 can be formed in the base 13.

Positioned between the front tab 11 and back tab 12 is a spring arm 16. In the illustrated embodiment, this spring arm 16 projects from one edge 17 of the base 13 in the general direction in which the front tab 11 and back tab 12 extend, but it diverges from the tabs 11 and 12 in a clip length direction L, as shown generally in FIG. 8. A second, correspondingly formed spring arm 19 projects from an opposite edge 20 of the base member 13 in an oppositely divergent direction.

To firmly secure the clip 10 to a backboard panel 25 having a perpendicularly turned flange 26 of predetermined thickness in accordance with the invention, the spring arms 16 and 19 are each at least partially defined by respective front edges 28 which are spaced apart from the front tab 11 in a clip depth direction, by a positive distance or amount E. To firmly pinch and grasp the flange 26 between the spring arms 16 and 19 and front tab 11, this distance E is a positive distance, but it is less than the thickness of the backboard flange 26. Thus, as may be envisioned from FIGS. 4 and 5, attachment of the clip 10 to the backboard flange 26 resiliently forces the front tab 11 away from the spring arms 16 and 19 in a clip depth direction D into a flange engagement position shown in FIG. 5 to squeeze the flange 26 between the spring arms 16 and 19 and the front tab 11.

Similarly, and in accordance with a further aspect of the invention, a cover panel 30 can be secured to the clip 10. To this end, spring arms 16 and 19 are each partially defined by respective back edges 32 which are spaced apart from the back tab 12 in a clip depth direction by a positive amount F. This positive amount F is less than the thickness of a clip-engaging foot formation 33 which can be provided at an edge 34 of the cover panel 30. Now, the back tab 12 is normally biased toward the spring arms 16 and 19 in clip depth direction when the cover 30 is not secured to the clip 13. However, when the cover 30 is moved toward the clip base 13 and into engagement with the clip 10, this action resiliently forces the back tab 12 away from the spring arms 16 and 19 in the clip depth direction and into a cover foot-engagement position such as that illustrated in FIG. 6 to squeeze the cover foot 33 between the spring arms 16 and 19 and back tab 12.

In accordance with yet another aspect of the invention, the gripping properties of the clip 10 are enhanced by other clip parts. Hook configurations 35 are formed at respective free ends 36 of the spring arms 16 and 19 and adjacent the front edges 28 thereof. These hook portions 35 are adapted to mate with the rounded outer surfaces of a backboard-flange corner 38. Thus, the spring arms 16 and 19 each contact and frictionally engage the backboard flange 26, the flange-backboard corner 38 and, if desired, a limited portion 39 of the backboard 25, as illustrated in FIGS. 5 and 6. Such construction accurately locates the clip 10 upon the flange 26 and backboard 25 in a clip height direction H, as shown particularly in FIG. 6.

It is a feature of the invention that, although the clip 10 grasps the backboard 25 and flange 26 with relatively great force, clip-backboard attachment is relatively easy. To this end, the clip front tab 11 is provided with an outwardly flared top 41 which is adapted to guide the inner surfaces 42 of the backboard flange into engagement with the clip. Similarly, the cover 30 and its foot position 33 are easily guided into engagement with the clip 10. To create this guiding action, each spring arm 16 and 19 is provided with a cam surface 45 adjacent the back edge 32 of the spring arm free end 36. The adjacent back tab 12 is provided with an outwardly flared free end 47; together, these spring arm cam surfaces 45 and the flared tab free end 47 act to cam and guide the cover foot 30 between the back tab 12 and spring arms 16 and 19 as the cover 30 is moved into engagement with the clip 10 and toward the clip base 13.

Installation of the clip 10 and its subsequent use is easy. First, as illustrated in FIGS. 2 and 3, the clip 10 is pushed upwardly over the backboard flange 26. As the clip reaches its final position upon the flange end 26 and backboard 25, the spring arms 16 and 19 engage the flange-backboard shoulder surfaces 38 and are pulled from their unstressed divergent or splayed positions toward the clip tabs 11 and 12 into more normal or perpendicular positions. With the clip so installed, the cover 30 may be urged downwardly between the spring arms 16 and 19 and back tab 12 toward the cover base 13, as illustrated in FIG. 3. Removal of the clip in a downward direction away from the flange is thus greatly discouraged.

The invention is claimed as follows:

1. A clip for attaching a cover panel having a planar foot of predetermined thickness to a backboard panel having an angularly turned flange of predetermined thickness, the clip comprising an upstanding front tab, an upstanding back tab spaced from the front tab in a clip depth direction, a base member interconnecting the front and back tabs in U-shaped configuration, and at least one spring arm extending upwardly from the base member and at least partially defined by a front spring arm edge and a back spring arm edge, the front spring arm edge being spaced apart from the front tab in a clip depth direction by a positive amount less than the backboard flange thickness, and the back-spring arm edge being spaced apart from the back tab in a clip depth direction by a positive amount less than the cover foot thickness.

2. A clip according to claim 1 wherein said front tab is normally biased toward the spring arm in a clip depth direction, and wherein attachment of the clip to the backboard flange resiliently forces the front tab away from the spring arm in a clip depth direction into a flange-engagement position to squeeze the flange between the spring arm and the front tab.

3. A clip according to claim 1 wherein said back tab is normally biased toward the spring arm in a clip depth direction and wherein attachment of the clip to the cover panel foot resiliently forces the back tab away from the spring arm is a clip depth direction into a cover foot engagement position to squeeze the cover foot between the spring arm and the back tab.

4. A clip according to claim 1 wherein said base member is substantially planar in shape, and is interposed between said front tab and said back tab in an orientation to cause the cover panel to be mounted to the clip at a position spaced apart from the position at which the backboard flange is mounted to the clip.

5. A clip according to claim 1 wherein said clip spring arm member projects from an edge of said base in the general direction in which said front and back tabs extend but diverges from the tabs in a clip length direction.

6. A clip according to claim 1 wherein said spring arm is provided with a hook configuration at a free end of the front edge, the spring arm front edge and hook portion being adapted to mate with the outer surface of the backboard flange and the surface of a flange-backboard face shoulder.

7. A clip according to claim 6 wherein said clip front tab is provided with an outwardly flared top adapted to guide the inner surface of the backboard flange toward the clip base as the clip is being attached to the backboard.

8. A clip according to claim 1 wherein said spring arm is provided with a cam surface at a free end of the back edge to guide the cover toward the clip back tab and between the back tab and spring arm as said cover is moved into engagement with the clip and toward the clip base.

9. A clip according to claim 1 wherein said clip back tab is provided with an outwardly flared free end to guide the cover between the back tab and spring arm as said cover is mounted into engagement with the clip and toward the clip base.

10. A clip according to claim 1 wherein said clip is provided with two spring arm members, one spring arm member projecting from each edge of said clip base in the general direction in which said front and back tabs extend but diverging from each other and from the tabs in a clip length direction.

11. A clip for attaching a cover panel having a planar foot of predetermined thickness to a backboard panel having a perpendicularly turned flange of predetermined thickness, the clip comprising an upstanding front tab, an upstanding back tap spaced from the front tab in a clip depth direction, a base member interconnecting the front tab in U-shaped configuration, and two spring arm members, one spring arm member projecting upwardly from each side of the base member in the general direction in which said front and back tabs extend but diverging from each other and from the tabs in a clip length direction, each spring arm being at least partially defined by a front spring arm edge, a hook configuration at a free end of the spring arm front edge, the spring arm front edge and hook portion being adapted to mate with the outer surface of the backboard flange and the surface of a flangebackboard face shoulder, the front spring arm edge being spaced apart from the front tab in a clip depth direction by a positive amount less than the backboard flange thickness, and the back spring arm being spaced part from the back tab in a clip depth direction by a positive amount less than the cover foot thickness.

12. A clip according to claim 11 wherein the distance from said clip base to said spring arm hook configuration is substantially equal to the length of said backboard panel flange measured in a direction perpendicular to the backboard face, the clip, when installed upon the backboard and backboard flange, having its spring arms resiliently urged from their unstressed diverging positions into positions more perpendicular to said base member and closer to said front and back tab portions in a clip length direction.

* * * * *